US010090924B2

(12) United States Patent
Schenk et al.

(10) Patent No.: US 10,090,924 B2
(45) Date of Patent: Oct. 2, 2018

(54) EFFICIENT ADDRESS ASSIGNMENT IN CODED LIGHTING POSITIONING SYSTEMS

(71) Applicant: PHILIPS LIGHTING HOLDING B.V., Eindhoven (NL)

(72) Inventors: Tim Corneel Wilhelmus Schenk, Eindhoven (NL); Hongming Yang, Eindhoven (NL); Lorenzo Feri, Eindhoven (NL); Wijnand Johannes Rietman, Eindhoven (NL); Johan Cornelis Talstra, Eindhoven (NL); Johan-Paul Marie Gerard Linnartz, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/958,279

(22) Filed: Dec. 3, 2015

(65) Prior Publication Data
US 2016/0204859 A1 Jul. 14, 2016

Related U.S. Application Data

(63) Continuation of application No. 13/263,199, filed as application No. PCT/IB2010/051420 on Apr. 1, 2010, now Pat. No. 9,210,776.

(30) Foreign Application Priority Data

Apr. 8, 2009 (EP) ..................................... 09157573

(51) Int. Cl.
*H05B 37/02* (2006.01)
*H05B 39/04* (2006.01)
(Continued)

(52) U.S. Cl.
CPC ....... *H04B 10/116* (2013.01); *H05B 37/0245* (2013.01); *H05B 37/0254* (2013.01); *H05B 37/0272* (2013.01); *H05B 33/0818* (2013.01)

(58) Field of Classification Search
CPC .............. H04B 10/116; H04B 10/1149; H04B 10/1143; H04B 10/40; H04B 10/60;
(Continued)

(56) References Cited

U.S. PATENT DOCUMENTS 7,391,297 B2 6/2008 Cash et al.
2002/0043938 A1 4/2002 Lys
(Continued)

FOREIGN PATENT DOCUMENTS

CN 1437809 A 8/2003
CN 1649350 A 8/2005
(Continued)

*Primary Examiner* — Anh Tran
(74) *Attorney, Agent, or Firm* — Meenakshy Chakravorty (57) ABSTRACT

Remote controllers, positioning systems, and methods configured for the efficient assignment of addresses in a coded lighting positioning system are proposed. Particularly, a proposed remote controller comprises a receiver for receiving coded light from a light source in a coded lighting positioning system, where the coded light comprises an initial light source identifier of the light source. The remote controller also comprises a processing unit for assigning a modified light source identifier to the light source based on the received coded light, and a transmitter for transmitting the modified light source identifier to the light source. The modified light source identifier is a locally unique identifier used to provide positional information.

13 Claims, 5 Drawing Sheets

(51) Int. Cl.
*H05B 41/36* (2006.01)
*H04B 10/116* (2013.01)
*H05B 33/08* (2006.01)

(58) Field of Classification Search
CPC ........ H04B 10/502; H04B 1/38; H04B 10/00;
H04B 10/25752; H05B 37/0272; H05B
37/0227; H05B 37/0245; H05B 33/0872
USPC .... 315/247, 291, 307–326, 224, 225, 185 S,
315/149–188
See application file for complete search history.

(56) References Cited

U.S. PATENT DOCUMENTS

| | | |
|---|---|---|
| 2006/0125426 A1 | 6/2006 | Veskovic et al. |
| 2007/0132405 A1 | 6/2007 | Hillis et al. |
| 2008/0292320 A1 | 11/2008 | Pederson |
| 2009/0026978 A1 | 1/2009 | Robinson |
| 2009/0184648 A1 | 7/2009 | Colak et al. |
| 2010/0090619 A1 | 4/2010 | Adamson et al. |
| 2010/0327766 A1* | 12/2010 | Recker ............... H02J 9/02 315/291 |
| 2012/0299509 A1 | 11/2012 | Lee et al. |
| 2013/0020947 A1 | 1/2013 | Weaver |
| 2013/0026940 A1 | 1/2013 | Ganick et al. |
| 2016/0072584 A1* | 3/2016 | Ganick ............... H04N 5/2256 398/118 |
| 2016/0227634 A1* | 8/2016 | Engelen ............. H05B 37/0245 |
| 2017/0041070 A1* | 2/2017 | Ryan ................ H04B 10/116 |

FOREIGN PATENT DOCUMENTS

| | | |
|---|---|---|
| JP | 0723047 A | 1/1995 |
| JP | H0729983 A | 1/1995 |
| WO | 2007095740 A1 | 8/2007 |

* cited by examiner

EFFICIENT ADDRESS ASSIGNMENT IN CODED LIGHTING POSITIONING SYSTEMS

CROSS-REFERENCE TO PRIOR APPLICATIONS

This application is a continuation of U.S. patent application Ser. No. 13/263,199, filed on Oct. 6, 2011, which is a U.S. National Phase application under 35 U.S.C. § 371 of International Application No. PCT/IB2010/051420, filed on Apr. 1, 2010, which claims the benefit of European Patent Application No. 09157573.8, filed on Apr. 8, 2009. These applications are hereby incorporated by reference herein.

FIELD OF THE INVENTION

The present invention relates to operating a lighting system. Particularly it relates to methods and devices for operating a lighting system comprising a plurality of light sources each of which is enabled to emit coded light.

BACKGROUND OF THE INVENTION

Coded light (CL) has been proposed to enable advanced control of light sources. Coded light is based on embedding of data, inter alia invisible identifiers, in the light output of the light sources. Coded light may thus be defined as the embedding of data and identifiers in the light output of a visible light source, wherein the embedded data and/or identifier preferably do not influence the primary lighting function (i.e. illumination) of the light source. Hence, any modulation of the emitted light pertaining to data and/or identifier should be invisible to humans. This allows for applications such as interactive scene setting, commissioning and re-commissioning of networked lighting systems. Coded light may be used in communications applications wherein one or more light sources in a coded lighting system are configured to emit coded light and thereby communicate information to a receiver. Also the light sources of the coded lighting system may be capable of bidirectional communications utilizing coded light. Thus coded light may be associated with the term visible light communication.

In a CL system, it may be desirable to identify and control the light sources in a given environment or in the proximity of a user or operator. For typical office environments such a coded lighting system may include in the order of 5 to 10 light sources. For future ambient creation systems (inter alia for retail) based on light emitting diodes (LEDs) the number of light sources could be at least one order higher, i.e. 20 to 200 light sources.

For identification and control of each light source, a light source should be distinguishable from all other light sources in the control network, not only local. In office environments, as an example, this control network may cover the whole building and might include 1000 light sources. The CL address space assigned for this environment should then at least include 1000 addresses, hence corresponding to 10 binary digits (bits).

In some system architectures, it might moreover be required to transmit coded light comprising a specific address format which might be even much longer. For example, in a first commissioning phase the light sources might be required to transmit the Internet protocol (IP) or media access control (MAC) addresses of the local lighting controller, inter alia based on the digital addressable light interface (DALI), followed by the assigned control address of the light sources, inter alia the DALI address. This might result in addresses of 70 bit length. Alternatively, a factory embedded unique identifier could be embedded in the light source/driver.

The size of the required address space makes that the preferred CL modulation techniques, such as code division multiple access (CDMA) and frequency division multiple access (FDMA), cannot be applied efficiently. This is caused by the fact that these are typically limited to, due to practical implementation issues, much smaller number of unique codes or frequencies, for CDMA and FDMA, respectively.

WO2007/095740 discloses a light source configured to send a beacon signal representative of the unique identifier thereof, on command, constantly or at a predetermined interval. The beacon signal is integrated into the light emitted by the light source, wherein the integration of the beacon signal is performed in a manner that visible flicker of the resultant light is imperceptible. A remote detection unit is configured to receive the light and extract the beacon signal therefrom. In this manner the remote detection device is capable of wirelessly determining the unique identifier of a light source.

SUMMARY OF THE INVENTION

For advanced user interaction with a lighting system one wants to identify, and estimate the strength of, the local light sources. This is enabled by CL. When worldwide or control network wide unique, and consequently long, addresses or codes are applied, however, efficient CL modulation methods cannot be applied to their best extent. This results in a long response time of the system, which might turn out to be unacceptable for some applications. Also, the suboptimal assignment of addresses or codes between the light sources might result in decreased performance in illumination contribution estimation.

Furthermore, the number of addresses needed to identify a light source globally may be two orders larger than what is needed to control the light sources in the local proximity or in a room.

It is an object of the present invention to ameliorate the problems discussed above, and to provide improved means for operating a lighting system, in particular for a coded lighting positioning system.

Generally, the above objectives are achieved by a remote controller, a lighting system, and a method for assigning an identity, according to the attached independent claims.

According to a first aspect, the above objects are achieved by a remote controller comprising a receiver for receiving coded light from a light source in a coded lighting system, the coded light comprising an initial light source identifier of the light source; a processing unit for assigning a modified light source identifier to the light source based on the received coded light; and a transmitter for transmitting the modified light source identifier to the light source. The modified light source identifier differs from the initial light source identifier and the modified light source identifier is a locally unique identifier used to provide positional information.

By providing a remote controller capable of receiving information pertaining to an initial identifier and assigning a modified identifier an improved (method of operating a) lighting system may be achieved. The disclosed remote controller may enable an efficient assignment of identifiers in a lighting system that are locally unique. The efficient assignment of identifiers may enable faster response time in a lighting system. This faster response would create a more natural interaction with the lighting system for the user.

Moreover the remote controller allows a smaller set of addresses to be applied in a lighting system. The addresses might be reused by different luminaires. Thereby a more efficient system requiring less complexity in the luminaires and remote controllers may be created. Also, the efficient assignment of addresses may yield more accurate estimation of illumination contributions of the individual light sources and reliable detection of the luminaire identities by the remote controller. Moreover, by using such a remote controller the need for multiple access technique or synchronization to be applied when the initial identifier is used may be reduced or even eliminated, which may reduce the complexity of the system.

The initial light source identifier may correspond to a world unique address identifier of the light source, e.g. associated with a serial number or other factory control information. Thereby the origin of the light source may be traceable. Thereby the light source may be uniquely identifiable.

The modified light source identifier may correspond to a unique address identifier of the light source in the coded lighting system. That is, the modified light source identifier may correspond to a local area address identifier of the light source.

The coded light comprising the initial identifiers may be transmitted using an initial access method. The processing unit may be arranged to assign a modified access method to the light source based on the received coded light. The transmitter may be arranged to transmit the modified access method to the light source. The initial access method may differ from the modified access method.

The coded light comprising the initial identifiers may be transmitted using an initial modulation method. The processing unit may be arranged to assign a modified modulation method to the light source based on the received coded light. The transmitter may be arranged to transmit the modified modulation method to the light source. The initial modulation method may differ from the modified modulation method.

Thus the access method and/or modulation method of the at least one light source may depend on the identifier. Thereby the access method and/or modulation method may be adapted to the conditions of the emitted light inter alia as received by a receiver.

The processing unit may be arranged to generate the modified light source identifier to be of a length being different from the length of the initial light source identifier.

For example, the modified identifier may include a smaller number of bits than the initial identifier. A short modified identifier may enable more accurate detection or reception of the same. The initial and/or modified identifiers, respectively may also be associated with a respective error correcting code, wherein the error correcting code may be adaptable to the channel conditions.

The remote controller may be arranged to utilize a different field of view for receiving coded light comprising the modified light source identifier than for receiving coded light comprising the initial light source identifier.

Thus, by using f.i. a narrow field of view the remote controller may be able to detect and uniquely identify a light source although the identifier of the light source is not locally unique. As new identifiers have been assigned a wide field of view may be utilized in order to investigate whether or not two or more light sources are associated with the same identifier. In addition, the remote controller may thereby achieve different angular resolutions depending on the field of view. Moreover, in the first phase applying a multiple access solution may be avoided, since the signal is only received from one light source. Any overhead data associated with a multiple access solution may be avoided. Another problem that may be avoided is the assignment of CDMA codes or FDMA codes, since all light sources of the lighting systems do not need to be simultaneously identifiable by the remote controller during the first phase. Multiple access may be desired in the second phase, since then it may be desirable to control the lighting system comprising multiple light sources. By utilizing multiple access multiple light sources may be simultaneously identifiable. Any codes, frequencies or time slots for multiple access can be assigned after the first phase.

The receiver may be arranged to receive coded light from at least two light sources each emitting coded light comprising individual initial light source identifiers. The processing unit may be arranged to assign individual modified light source identifiers to the at least two light sources based on the received coded light from the at least two light sources. The individual modified light source identifiers may be generated by redistributing at least two of the individual initial light source identifiers among the at least two light sources.

Thus generating a new set of identifiers may be avoided. This may enable a shorter time for assigning the modified identifiers. The redistribution may depend on the location of the individual light sources in a lighting system. The redistribution may involve locally separating identifiers of neighboring light sources, such that the identifiers of the neighboring light sources are maximally separated.

The processing unit may be arranged to assign the modified identifier based on at least one property of the received coded light. Thus the second identifier may be based on at least one from a number of properties of the emitted light of the at least one light source and not only on the currently assigned identifier of the at least one light source. Thereby a more reliable second identifier, in terms of inter alia error correcting and/or detecting capabilities and/or accuracy in illumination contribution estimation, may be assigned to the at least on light source.

The remote controller may form part of a lighting system. According to a second aspect, the above objects are achieved by a lighting system, possibly comprising a remote controller as disclosed above and a light source enabled to emit coded light comprising a light source identifier, wherein the light source comprises: an emitter for emitting the coded light comprising the initial light source identifier; and a receiver for receiving, from the remote controller, information to assign the modified light source identifier to the light source and wherein the modified light source identifier is a locally unique identifier used to provide positional information.

The emitter may be arranged to emit the coded light using an initial access or modulation method; the receiver may be arranged to receive instructions to use a modified access or modulation method, and the emitter may further be arranged to emit the coded light using the modified access or modulation method based on the instructions.

The light source may be part of a luminaire.

According to a third aspect of the present invention, the objects are achieved by a method for assigning an identity to a light source in a coded light lighting system comprising the steps of receiving coded light from a light source in a coded lighting system, the coded light comprising an initial light source identifier of the light source; assigning a modified light source identifier to the light source based on the received coded light; and transmitting the modified light source identifier to the light source, wherein the initial light source identifier differs from the modified light source identifier and the modified light source identifier is a locally unique identifier used to provide positional information.

The assigning method according to the third aspect of the present invention may be implemented in a method of operating a lighting system. According to a fourth aspect of the present invention, the objects are achieved by a method of operating a lighting system comprising a remote controller and a light source enabled to emit coded light comprising a light source identifier, the method comprising the steps of emitting, from the light source, the coded light comprising an initial light source identifier; assigning a modified identifier to the light source according to the above method for assigning an identity to a light source in a coded light lighting system, and emitting, from the light source, coded light comprising the modified light source identifier and the modified light source identifier is a locally unique identifier used to provide positional information.

The lighting system may comprise a plurality of light sources. The method may further comprise the step of emitting, from at least one light source of the plurality of light sources, the coded light comprising the modified light source identifier.

Thus, as the at least one light source has been provided with a modified identifier it may emit coded light comprising the modified identifier. Thereby it may be verified that the identifier of the at least one light source has been correctly updated.

The initial light source identifier may be used in a set-up mode and the modified light source identifier may be used in a use mode. The initial identifier may comprise information or data which may be usable in a set-up mode. This information or data may be excluded in the use mode in case it is decided that further reassignment of the identifier is not required. Thereby the complexity of the identifier used in the use mode may be reduced.

For example, the modified identifier may have a number of bits in common with the initial identifier. Thereby an efficient procedure for assigning modified identifiers may be achieved.

The objective is thus inter alia achieved by a system, which during an initial phase, or mode, uses an initial set of addresses, which may be long addresses and which may be unique throughout the system or the entire world. During a second phase, or mode, however, the system uses more efficient identification, access and/or modulation methods that only require local uniqueness and enables the use of wide field of view optical sensors.

These and other aspects of the invention will be apparent from and elucidated with reference to the embodiments described hereinafter.

It is noted that the invention relates to all possible combinations of features recited in the claims. Thus, in general, the second, third, and fourth aspects may have the same advantages as the first aspect.

BRIEF DESCRIPTION OF THE DRAWINGS

These and other aspects of the present invention will now be described in more detail, with reference to the appended drawings showing a currently preferred embodiment of the invention.

DETAILED DESCRIPTION

The present invention will now be described more fully hereinafter with reference to the accompanying drawings, in which certain embodiments are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
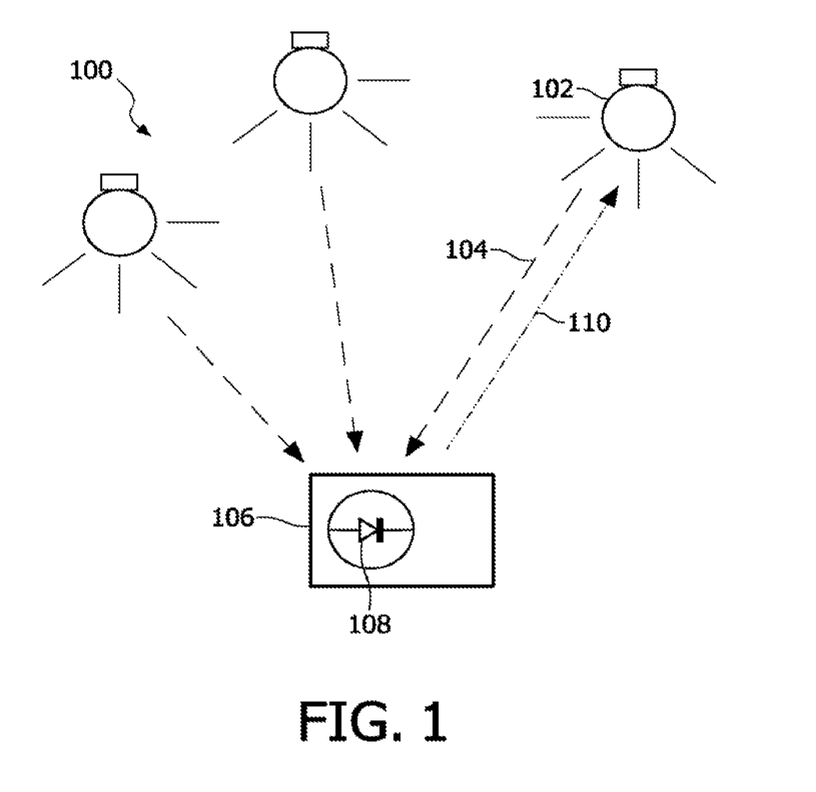
FIG. 1 is a lighting system according to an embodiment of the present invention.

Operation of a lighting system will now be disclosed with reference to the lighting system 100 of FIG. 1. The lighting system 100 comprises at least one light source, schematically denoted by the reference numeral 102.

It should be noted that the term "light source" means a device that is used for providing light in a room, for purpose of illuminating objects in the room. Examples of such light providing devices include lighting devices and luminaires. A room is in this context typically an apartment room or an office room, a gym hall, a room in a public place or a part of an outdoor environment, such as a part of a street.

Each light source 102 is capable of emitting coded light comprising a light source identifier, as schematically illustrated by the arrow 104. Each light source 102 may be associated with a number of lighting settings, inter alia colour, colour temperature and intensity of the emitted light.

The system 100 further comprises an apparatus 106, termed a remote controller, for detecting and receiving the coded light comprising the light source identifier emitted by the light source 102. The apparatus 106 comprises a light sensor 108 for detecting the light emitted by the light source(s) in the system 100.

Figure 2:
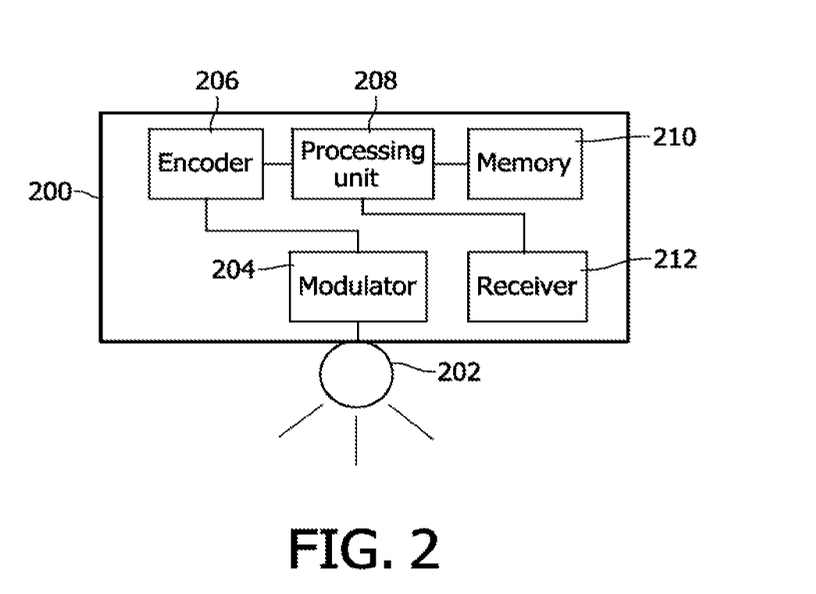
FIG. 2 is a light source in the system in FIG. 1.

FIG. 2 schematically illustrates the internal components of a light source 200, such as the light source 102 of FIG. 1 as disclosed above. The light source 200 is thus configured to emit coded light, wherein the coded light comprises a light source identifier of the light source 200. The light source comprises an emitter 202 for emitting the coded light. The light source 200 further comprises a receiver 212 for receiving information to assign a modified light source identifier to the light source 200. The receiver 212 may be a receiver configured to receive coded light. The receiver 212 may comprise an infrared interface for receiving infrared light. Alternatively the receiver 212 may be a radio receiver for receiving wirelessly transmitted information. Yet alternatively the receiver 212 may comprise a connector for receiving information transmitted by wire. The wire may be a powerline cable. The wire may be a computer cable. The light source 200 may further comprise other components such as a processing unit 208, a memory 210, an encoder 206 and a modulator 204 operated according to principles which as such are known to the skilled person. The processing unit 208 may comprise a central processing unit (CPU). Particularly, the processing unit 208 may be operatively connected to the receiver 212. The processing unit 208 may thus receive information from the receiver 212 pertaining to assigning a modified identifier to the light source 200. Based on this information the processing unit 208 may request the encoder 206 to change the encoding of the coded light such that the coded light comprises the modified identifier. The encoder 206 may comprise a pulse generator. Information pertaining to the identifiers, such as code parameters used by the encoder 206, may be stored in a memory 210. The updated code sequence, as generated by the encoder 206, may then be utilized by the modulator 204 which is configured to modulate the light. The modulator 204 may comprise an intensity controller. The coded and modulated light may then be emitted by the emitter 202. The emitter may be a light emitting diode or the like. At least one light source 200 may be comprised in a luminaire (not shown). Thus such a luminaire may comprise at least one light source 200, wherein each light source may be assigned individual light source identifiers.

Figure 3:
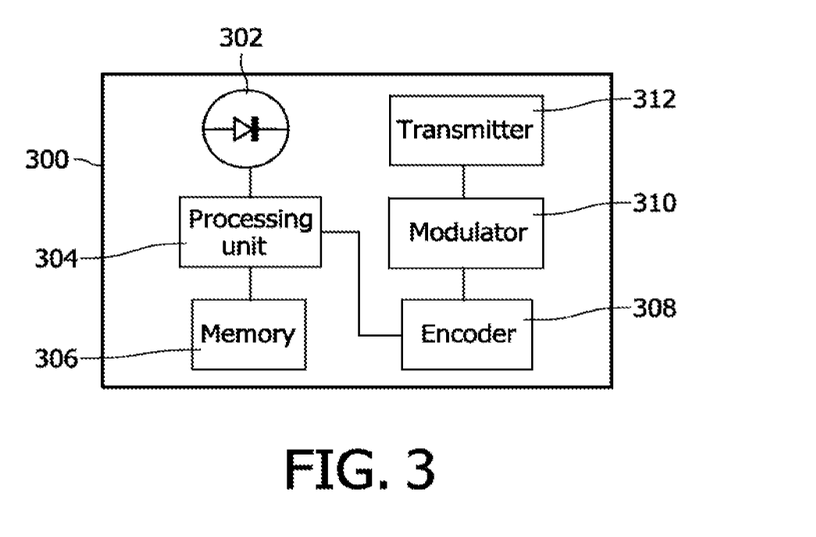
FIG. 3 is a remote controller in the system in FIG. 1.

FIG. 3 schematically illustrates the internal components of a remote controller 300, such as the remote controller 106 of FIG. 1 as disclosed above. The remote controller 300 comprises a receiver 302 for receiving coded light from at least one light source, such as the light source 102, 200. The remote controller 300 is further configured to detect an initial light source identifier comprised in the received coded light and being associated with a light source. The identification of the light source identifier may be performed in a processing unit 304. The processing unit 304 may comprise a central processing unit (CPU). The processing unit 304 is further configured to assign a modified light source identifier to the light source associated with the received coded light based on the received coded light. The processing unit 304 may be configured to estimate or determine at least one property of the light source emitting the coded light and/or at least one property of the light emitted by the light source. The remote controller 300 further comprises a transmitter 312 for transmitting the modified light source identifier to the light source. The remote controller 300 may further comprise other components such as a memory 306, an encoder 308 and a modulator 310 operated according to principles which as such are known by the skilled person. Particularly, the memory 306 may comprise a set of identifiers, or addresses which may be transmitted to light sources in a lighting system. The memory 306 may comprise stored instructions pertaining to generating a set of identifiers, or addresses. The memory 306 may comprise stored instructions pertaining to identification of light sources from the received coded light. The transmitter 312 may be a light transmitter configured to emit coded light. Alternatively the transmitter 312 may be a radio transmitter configured to wirelessly transmit information. The transmitter 312 may be configured for bidirectional communications. The transmitter 312 may comprise a radio antenna. Alternatively the transmitter may comprise a connector for wired communications. The remote controller 300 may be configured to provide an audible, tactile or visual feedback message when the remote controller detects that the light source emits coded light comprising the modified light source identifier (inter alia in order to signal to a commissioner that the switch from the initial light source identifier to the modified light source identifier has been successful and that the light source, or luminaire, is now commissioned and part of the system).

Figure 6:
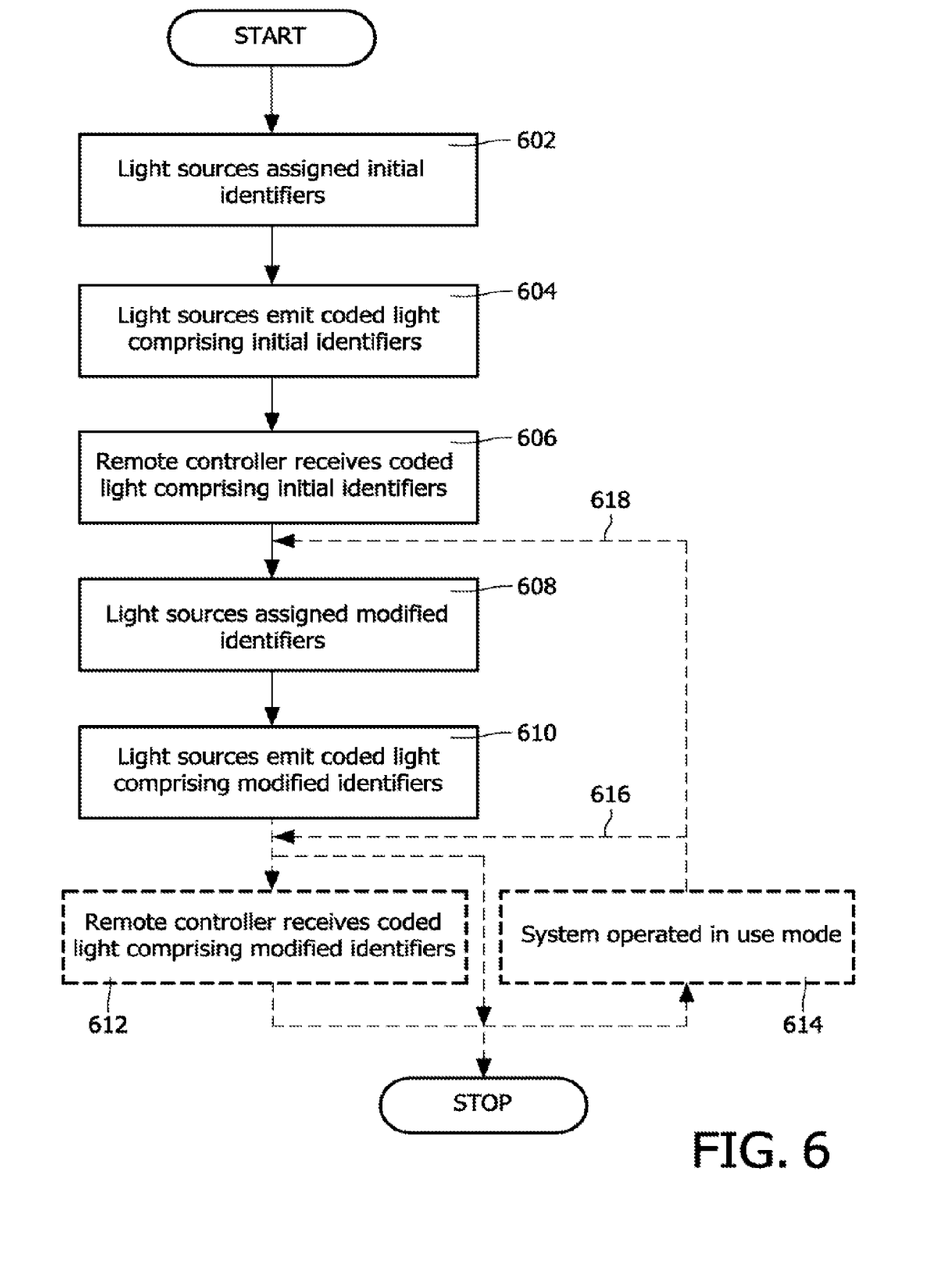

FIG. 6 is a flowchart of a method in a system, such as the lighting system 100, comprising a remote controller and a light source. The light sources are assigned (individual) initial identifiers, step 602. The initial identifiers may be assigned during manufacturing of the light sources. The initial identifiers may be associated with a manufacturing code, a control number, a serial number, or the like, of the light source. That is, the initial identifiers may be factory settings. Alternatively, the initial identifiers may be randomly generated (by the light source). Each light source is capable of emitting coded light, step 604, comprising the light source identifier.

Figure 7:
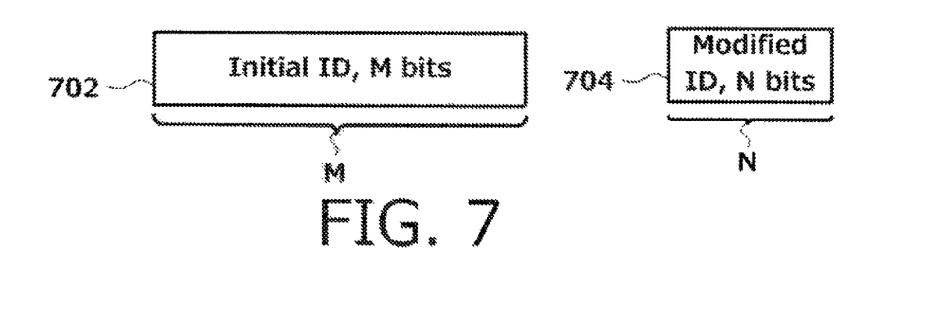

According to embodiments the coded lighting system is operable in at least two modes, or phases, (the terms mode and phase will in this context be used interchangeably) where in the first phase different identifiers of the light sources is applied than in the second phase. Initial identifiers are used in the first phase whereas modified identifiers are used in the second phase. The modified identifiers may be associated with more (time) efficient reception than the initial identifiers. In the first phase, which may be an initiation phase or a set-up mode, the light sources are thus operable to emit coded light comprising the initial light source identifiers. The initial light source identifiers may correspond to world unique address identifiers of the light sources. That is, the initial light source identifiers may correspond to wide area address identifiers of the light sources. In a second phase, which may be an operation phase or a use mode, the light sources are operable to emit coded light comprising the modified light source identifiers, wherein the initial light source identifiers differ from the modified light source identifiers. The modified light source identifiers may correspond to unique identifiers of the light sources in the system. That is, the modified light source identifiers may correspond to local area address identifiers of the light sources. FIG. 7 depicts an example of an initial light source identifier 702 with M bits and a modified light source identifier 704 with N bits. As indicated by the respective widths of 702 and 704, M is greater than N.

Thus, after reception, by the remote controller, of the coded light comprising the initial identifier, step 606, the remote control is operable to assign modified identifiers to the light sources associated with the light received by the remote controller, step 608. The remote controller is furthermore operable to communicate the modified identifiers to each individual light source in the lighting system. The light sources may then emit the coded light comprising the modified light source identifiers, step 610.

The remote controller may receive the coded light comprising the modified identifiers, step 612.

When the modified light source identifiers have been assigned the system may operate in the second phase, which may be a use mode, step 614.

The reassignment or reshuffling of modified identifiers (such as addresses, codes, or frequencies) can be done in an iterative manner, steps 616, 618. This procedure has the advantage that it enables an adaptive optimal identifier assignment. In other words, an optimal identifier assignment is enabled even when the location of the remote controller is moved during the act of controlling the system in the use mode.

Time division multiple access (TDMA) or random access (RA) solutions may be used when the initial light source identifiers are used. RA may be implemented according to the Aloha protocol. Particularly, the Aloha protocol without acknowledgement may be utilized. Long identifiers, or addresses, may result in a large reaction time, due to the limited bandwidth of the CL channel. Such long reaction times might be acceptable for initial commissioning, system setup or system configuration, but might not be acceptable for user interaction in scene setting or other more advanced applications, such as applied in the use mode.

Since a light source and its corresponding identifier may identify a position, the coded lighting system may be utilized for positioning applications. For example, the coded lighting system may be utilized for providing positional information in a building, thereby inter alia providing means for finding a user's way in the building. For such an example it may be desirable to utilize a remote controller having a wide field of view and therefore locally unique identifiers may be desirable.

According to embodiments, the length of the modified light source identifiers may be different from the length of the initial light source identifiers. Particularly, the length of the modified light source identifiers may be shorter than the length of the initial light source identifiers. This enables a shorter acquisition and resulting system response time. The operation mode in the second mode may enable applications in the area of lighting controls, such as scene setting, which might not be possible with the response times in the first mode. The second mode may also include control loops, which may require additional sequential control and measurement steps. These measurements may require every time to identify and estimate the contributions of all light sources, hence the time for one measurement should be low.

As disclosed above the response time might be long when the initial light source identifiers are used, especially in cases when identification or addressing by means of codes transmitted using RA is used. In such cases it may be necessary to avoid collisions between identifiers from different light sources. Therefore a remote controller with a narrow field of view (FOV) may be applied when the initial light source identifiers are used where the user points the receiver to (individual light sources from) a sub-set of light sources. The selected light source(s) may then be assigned modified identifiers which are shorter than the initial identifiers and which might be received using different optics (with a wide FOV). The long reaction times may thus be overcome by the use of optical sensors with limited FOV, where the remote controller, firstly only observes one light source of a plurality of light sources in the lighting system, whilst the rest of the light sources may be suppressed by the optical solution. In such cases the light source can continuously transmit the initial light source identifier and the delay may be limited. A narrow FOV may be associated with a first angular resolution, whereas a wide FOV may be associated with a second angular resolution. The first angular resolution may be higher than the second angular resolution. That is, the remote controller may utilize different angular resolution for receiving coded light comprising the initial light source identifier than for receiving coded light comprising the modified light source identifier. Also, as disclosed above, the first phase wherein the initial light source identifiers are used may be considered a configuration step, which may only need to occur during installation or reconfiguration of the lighting system. Operation as disclosed with reference to the second phase wherein the light sources emit coded light comprising the modified light source identifiers may cover the normal operation and control of the lighting system.

According to embodiments the same modulation and/or multiple access method may be used for both phases, or modes. Alternatively the coded light emitted during the first mode may be modulated differently than the coded light emitted during the second mode and/or a different multiple access technique might be applied during the first and second modes, respectively. For example RA can be used in the initial phase, the outcome (such as intensity estimates and/or light source identification) of which may be used in the second phase to assign modified light source identifiers associated with a second multiple access method. The second multiple access method could inter alia be CDMA based, where different spreading code words are assigned to the different light sources observed in the first phase. Practical CDMA systems can only assign a limited number of code words. The same holds for TDMA and FDMA, where the identified light sources in an environment are assigned timeslots and operation frequencies, respectively, the total number of which is also limited. As disclosed above, for the operation in the second phase the identifiers only need to be locally unique (i.e. the identifiers or addresses are not longer world/control network-wide unique), depending on the foreseen application. As an example, a locally unique identifier may be an identifier which, according to the remote controller, is unique for a particular lighting system. The remote controller may be capable of storing information pertaining to a plurality of lighting systems.

The assignment for the second phase may use not only the initial identifiers, or addresses, of the identified light sources during the first phase, but also additional information acquired during the first phase. For example, the additional information may pertain to information, such as data, comprised in the transmitted light, as further disclosed below. Also, this information could be the estimated relative intensities. Also the relative location of the light sources can be used, inter alia as found by using a multiple diode based photo sensor or camera solution in the receiver. For the FDMA embodiments, as an example, this may be of interest, since neighboring frequencies may not yield full orthogonality. This is caused by limited acquisition time and frequency inaccuracies of the frequency sources. The further two frequencies applied by two light sources are separated (i.e. the larger the frequency difference between the two frequencies applied by two light sources), the better they can be identified. Consequently, neighboring light sources, as identified in the first phase, may be assigned frequencies that are not adjacent. The same holds for CDMA codes, where "most orthogonal" codes be assigned to neighboring light sources. As an effect not only the acquisition time may be decreased, but also the estimation accuracy and correct identifier detection probability for the application may be increased.

Also other relative properties of the light sources may be utilized. An estimation of a relative property may involve estimating the absolute, or individual, properties of two or more light sources. Relative properties may be deduced from comparing absolute properties. The assigning may thus be based on at least one property of the received coded light. The at least one property may be illumination contribution. The at least one property may be radiation contribution. The at least one property may be light color. The at least one property may be wavelength. The at least one property may be angle. The at least one property may be the position of the at least one light source in the lighting system. The at least one property may be relative properties of the above properties, such as relative illumination, radiation, color, wavelength, angle, and/or position. The at least one property may be a combination of at least two of the above properties, and/or relative properties. Alternatively, the property may be based on other information embedded in the coded light during the first phase. For example the data may be associated with description of the light source, such as its size, lumen output, emitted colour of light, or the like. Thus one advantage may be that the remote controller may not need to measure or estimate these properties. Alternatively the remote controller may compare the received description of the light source with measured or estimated properties of the light source in order to assign a suitable new, modified, identifier.

For such embodiments the same multiple access method can be used in the first and second phases, where effectively a reshuffling of the identifiers occurs. That is, the modified light source identifiers may be generated by redistributing at least two of the initial light source identifiers among the light sources.

According to embodiments the first phase (i.e. operation in the set-up mode) may be omitted. Each light source may choose, or be assigned, a short random initial identifier from a pool of available random initial identifiers. This could also be accomplished by applying a specific function to the (wide-area) unique initial identifiers to obtain the short (local-area) modified identifiers. During the second phase each light source may communicate its chosen identifier via the emitted light. The remote controller may observe the addresses comprised in the light emitted by the light sources. The CL receiver may then communicate information requesting an acknowledgement from all light sources associated with this identifier. Hence, if two of more light sources reply, multiple light sources have chosen the same random identifier. The conflicting light sources may then be assigned new non-overlapping identifiers. Alternatively, the conflicting light sources may be requested to randomly pick new identifiers. The procedure is repeated until all light sources have different short identifiers. Alternatively the remote controller communicates over a control network the observed identifiers whilst the corresponding light sources identify themselves over the control network with their identifiers. A system master may suggest the new non-overlapping identifiers. Alternatively, the system master may have an overview of the short identifier selection of all the light sources in a memory. Thereby the system master may verify that there is no identifier overlapping.

A first remote controller may read the initial identifiers of the lighting system, whereas the modified identifiers may be assigned by a second remote controller. The first remote controller may communicate its findings, such as the initial and/or modified identifiers, to the second remote controller (and vice versa).

Next a procedure for assigning modified identifiers will be provided. The following notation for time scales will be useful: T1 represents the finest time resolution that can be used for switching on and off the light source. In other words, T1=1/f, where f is the clock frequency of the light source, such as the clock frequency of a light emitting diode capable of achieving a throughput off bits per second for binary modulation. For example, T1 may be a few tens of nanoseconds, yet for illumination control applications it can often be sufficient to clock the light source at about 1 microsecond. T2 represents the duration of an interval during which one on and one off switching operation of the light source may be accommodated. A period T2 is called a frame. T2=N1*T1, where N1 is an integer. T3 represents the time interval used for the transmission of one user symbol (a certain code or light source identifier, for example the digital code 0110), or for one measurement of the illumination contribution. T3=N2*T1, where N2 is an integer. According to embodiments the light source receives a T1 clock, but the light source may not necessarily be aware of the timing of the T2 or T3 layers. In other words, all light sources may have a perfect clock for T1 (i.e. the frequency is perfect, but the phase may be random). The light source may use the alternating 1010101 . . . -code in the Walsh-Hadamard (WH) set and an arbitrary time position xi in the N1 frame to generate the initial identifier of the light source. Since the alternating code is shift invariant, a T3 phase offset will not matter. The remote controller detects this signal, and in particular measures its phase offset in the T2 block. After reception of this signal, the remote controller assigns a (delta to a) new position xo in order to generate the modified identifier. The light source starts sending a sync code, such as 111110000, and the remote controller sends the (delta to) the start of the T2 interval. The remote controller may then send a new offset in the T2 block, and assign one of the other usable WH codes, referred to as yi, to the light source and transmits the corresponding new pair xi, yi, thereby completing the generation of the modified identifier. The system may then operate in a use mode. During the use mode each light source thus has its own unique value xi, yi and hence each light source has its own unique modified identifier. Although two light sources may have either the same xi or the same yi, they may not have identical pairs xi, yi. More generally, a clock timing offset reference may be generated in the switch from the installation mode to the use mode. Thus according to embodiments, in the first phase, or mode, the coded light emitted by the light source may not be in synchronization with the remote controller, whereas in the second phase, or mode, the coded light emitted by the light source is in synchronization with the remote controller. In other words, according to embodiments the coded light emitted by the light source is in synchronization with the remote controller exclusively in the second phase, or mode.

Figure 4:
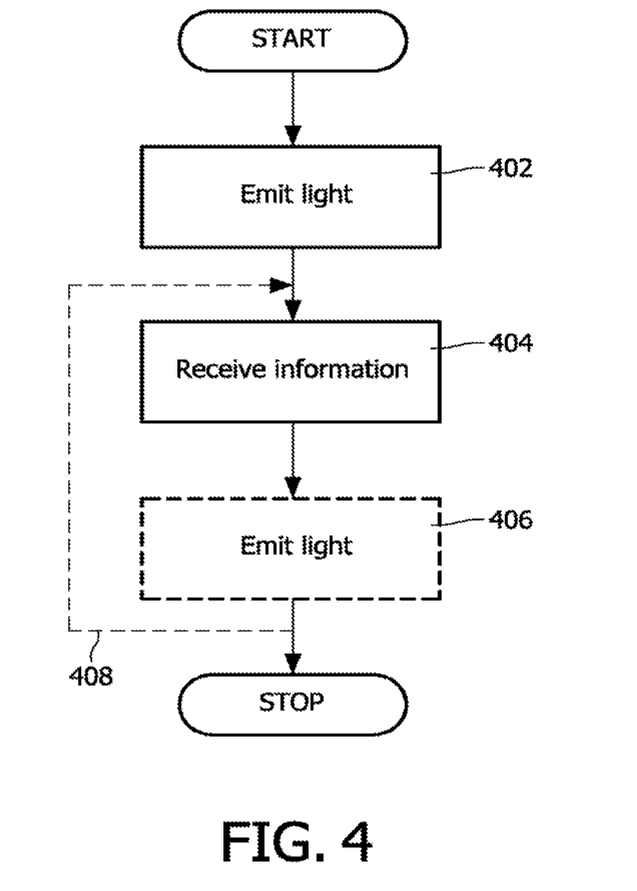
FIGS. 4-7 are flowcharts according to embodiments of the present invention.

FIG. 4 is a flowchart of a method in a light source, such as the light sources 102 and 200 of FIGS. 1 and 2 as disclosed above, for assigning an identity to the light source. The method comprises in a step 402 emitting, from the light source, coded light comprising an initial light source identifier. In FIG. 1 this is indicated by reference numeral 104. The light is emitted by the emitter 202 of the light source 200. The method further comprises in a step 404 receiving, by the light source, information to assign a modified light source identifier to the light source, wherein the received information is based on the emitted coded light. In FIG. 1 this is indicated by reference numeral 110. The light is received by the receiver 212 of the light source 200. The method may comprise in a step 406 emitting, from the light source, coded light comprising the modified light source identifier. As disclosed above the method may be iterated; the light source may receive further information pertaining to assignment of a further modified identifier, and so on, as indicated by the feedback loop represented by the reference numeral 408.

Figure 5:
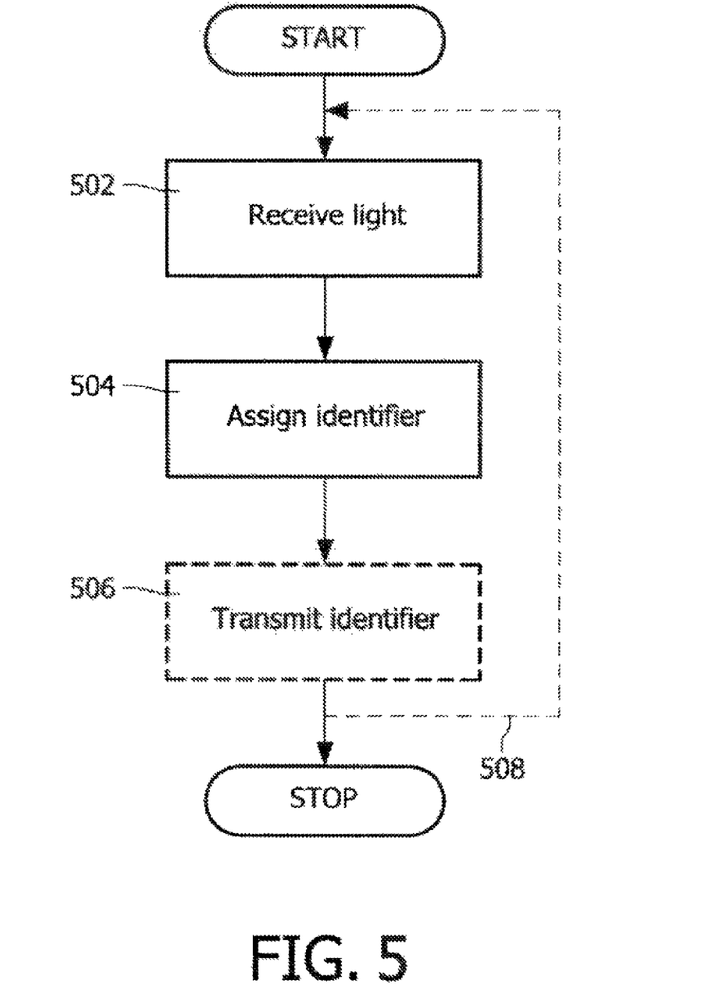

FIG. 5 is a flowchart of a method in a remote controller, such as the remote controllers 106 and 300 of FIGS. 1 and 3 as disclosed above, for assigning an identity to a light source, such as the light sources 102 and 200 of FIGS. 1 and 2 as disclosed above. The method comprises in a step 502 receiving, from a light sources, coded light comprising an initial light source identifier. The light is received by the receiver 108, 302 of the remote controller 106, 300. The method further comprises in a step 504 assigning a modified light source identifier to the light source based on the received coded light. The assignment may be performed in a processing unit 304 of the remote controller 300. In a step 506 the modified light source identifier is transmitted from the remote controller to the light source. The modified light source identifier may be transmitted by the transmitter 312 of the remote controller 300. As disclosed above the method may be iterated; the remote controller may assign a further modified identifier based on the received light, and so on, as indicated by the feedback loop represented by the reference numeral 508.

The person skilled in the art realizes that the present invention by no means is limited to the embodiments described above. On the contrary, many modifications and variations are possible within the scope of the appended claims.

The invention claimed is:

1. A remote controller comprising:
a receiver for receiving coded light from a light source in a coded lighting positioning system, said coded light comprising an initial light source identifier of said light source;
a processing unit for assigning a modified light source identifier to said light source based on the received coded light, wherein the modified light source identifier is a locally unique identifier used to provide positional information; and
a transmitter for transmitting said modified light source identifier to said light source.

2. The remote controller according to claim 1, wherein said initial light source identifier corresponds to a world unique address identifier of said light source.

3. The remote controller according to claim 1, wherein said modified light source identifier corresponds to a unique address identifier of said light source in said coded lighting positioning system.

4. The remote controller according to claim 1, wherein said processing unit is arranged to assign said modified identifier based on the relative position of said light source with respect to other light sources in said coded lighting positioning system.

5. The remote controller according to claim 1, wherein the initial light source identifier is detected using a camera in the receiver.

6. The remote controller according to claim 1, wherein the initial light source identifier is transmitted using an initial access or modulation method and wherein the modified light source identifier is transmitted using a predetermined modified access or modulation method and wherein said predetermined modified access or modulation method differs from said initial access or modulation method.

7. The remote controller according to claim 1, wherein the modified light source identifier comprises the initial light source identifier.

8. The remote controller according to claim 1, wherein said coded light comprising said initial light source identifier is transmitted using an initial access or modulation method; wherein said processing unit is arranged to assign a modified access or modulation method to said light source based on the received coded light;
said transmitter is arranged to transmit instructions to said light source to use said modified access or modulation method, and wherein
said modified access or modulation method differs from said initial access method.

9. The remote controller according to claim 1, wherein said processing unit is arranged to generate said modified light source identifier to be of a length different from the length of said initial light source identifier.

10. The remote controller according to claim 1, wherein said remote controller is arranged to utilize a different field of view for receiving coded light comprising said modified light source identifier than for receiving the coded light comprising said initial light source identifier.

11. The remote controller according to claim 1, wherein said receiver is arranged to receive coded light from at least two light sources emitting coded light comprising individual initial light source identifiers; wherein
said processing unit is arranged to assign individual modified light source identifiers to said at least two light sources based on the received coded light from the at least two light sources; and wherein
said individual modified light source identifiers are generated by redistributing at least two of the individual initial light source identifiers among said at least two light sources.

12. The remote controller according to claim 1, wherein said processing unit is arranged to assign said modified identifier based on at least one property of said received coded light, wherein said at least one property is at least one from the group of illumination contribution, relative illumination contribution, radiation contribution, relative radiation contribution, light color, wavelength, angle, relative angle, and relative position of said at least one light source in said coded lighting positioning system.

13. The remote controller according to claim 1, wherein the remote controller comprises a memory, the memory arranged for storage of a set of modified light identifiers which may be transmitted to the light sources in the coded lighting positioning system.

* * * * *